(12) United States Patent
Lu

(10) Patent No.: US 8,640,307 B2
(45) Date of Patent: Feb. 4, 2014

(54) HINGE AND FLIP DEVICE WITH THE SAME

(75) Inventor: Lee-Yeh Lu, New Taipei (TW)

(73) Assignee: Shen Yuann Industry Co., Ltd., New Taipei (TW)

( * ) Notice: Subject to any disclaimer, the term of this patent is extended or adjusted under 35 U.S.C. 154(b) by 23 days.

(21) Appl. No.: 13/540,420

(22) Filed: Jul. 2, 2012

(65) Prior Publication Data

US 2014/0001939 A1    Jan. 2, 2014

(51) Int. Cl.
*E05C 17/64*    (2006.01)

(52) U.S. Cl.
USPC ............... 16/342; 16/319; 16/385; 16/386

(58) Field of Classification Search
USPC .......... 16/75, 86 A, 86 R, 229, 232, 250, 253, 16/319, 339, 342, 350, 356, 380, 385, 386, 16/390–392, DIG. 13
See application file for complete search history.

(56) References Cited

U.S. PATENT DOCUMENTS

| | | | | |
|---|---|---|---|---|
| 4,256,388 A | * | 3/1981 | Beyer | 351/158 |
| 4,353,146 A | * | 10/1982 | Brockhaus | 16/387 |
| 4,675,940 A | * | 6/1987 | Brockhaus | 16/273 |
| 4,869,585 A | * | 9/1989 | Romanet | 351/153 |
| 7,100,244 B2 | * | 9/2006 | Qin et al. | 16/330 |
| 7,552,512 B2 | * | 6/2009 | Duan et al. | 16/330 |
| 2002/0042971 A1 | * | 4/2002 | Liao | 16/342 |
| 2005/0034274 A1 | * | 2/2005 | Wu | 16/342 |
| 2007/0192994 A1 | * | 8/2007 | Chuang | 16/342 |

* cited by examiner

*Primary Examiner* — Roberta Delisle

(74) *Attorney, Agent, or Firm* — Tracy M Heims; Apex Jurls, pllc

(57) ABSTRACT

A hinge has a central element and a surrounding element. One of the central element and the surrounding element is formed by injection molding, and the other element is then formed on the priorly-formed element by injection molding such that a limit segment is mounted around the neck segment having a smallest outer width of the central element, which keeps the surrounding element from departing from the central element, and further simplifies a structure of the hinge. Because a melting point of the element formed priorly is higher than a melting point of the element formed later, the element formed later does not attach to the element formed priorly, and the two elements are relatively rotatable. Finally, because the manufacture of the hinge is accomplished after injection molding twice, the process of manufacturing the hinge is more convenient, faster and lowers the cost.

18 Claims, 7 Drawing Sheets

HINGE AND FLIP DEVICE WITH THE SAME

BACKGROUND OF THE INVENTION

1. Field of the Invention

The present invention relates to a hinge, especially to a simplified hinge mounted between a cover and a base of a flip device.

2. Description of the Prior Arts

Hinge is a device to rotate two objects relatively, and is usually used in flip devices, such as notebook computers. Two ends of the hinge are respectively connected securely to the base and the cover of the notebook computer. Then the cover can be opened or closed relative to the base.

A conventional hinge has a central element, a surrounding element and a fastener. The surrounding element is mounted rotatably around the central element. The fastener is mounted on an end of the central element. The surrounding element is clamped between the fastener and the central element, which keeps the surrounding element from departing axially from the central element. When the hinge is used, the central element and the surrounding element are respectively connected securely to two objects, which are to rotate relatively.

The conventional hinge only can allow two objects to rotate relative to each other. For achieving more functions, the conventional hinge usually comprises other elements such as a convex and concave washer assembly. The convex and concave washer assembly has two actuating washers and a spring. The actuating washers have corresponding shapes. The actuating washers and the spring are mounted around the central element. One of the actuating washers is connected securely to the central element, and the other one of the actuating washers is connected securely to the surrounding element. The spring makes the actuating washers abut each other. Normally, the actuating washers engage each other, but once the surrounding element and the central element are rotated relatively by an external force, the actuating washers rotate relatively as well. Then the actuating washers disengage from each other, and compress the spring therefore. When the external force is removed, the spring then pushes one of the actuating washers to make the actuating washers recovered to engage each other. As a result, when the actuating washers engage each other, the two objects are held at a specific angle, such as 90 degrees.

However, the conventional hinge has the following shortcomings.

First, the conventional hinge comprises many components. Besides the components mentioned above, the conventional hinge may further comprise abrasion washers, screws and nuts. The structure of the conventional hinge is complicated, so the manufacturing process takes much time and effort. The cost is also increased therefore. Furthermore, the conventional hinge comprises many components so that the connection between the components of the conventional hinge is not stable enough.

Second, the conventional hinges are mostly made of metal, which also costs a lot.

To overcome the shortcomings, the present invention provides a hinge and a flip device with the same to mitigate or obviate the aforementioned problems.

SUMMARY OF THE INVENTION

The main objective of the present invention is to provide a hinge that comprises fewer components, is of a simplified structure and made by a simplified process, and lowers the cost.

The hinge in accordance with the present invention has a central element and a surrounding element. One of the central element and the surrounding element is formed by injection molding, and the other element is then formed on the priorly-formed element by injection molding such that a limit segment of the surrounding element is mounted around and flush with the neck segment having a smallest outer width of the central element, which keeps the surrounding element from departing axially from the central element, and further reduces the number of the components and simplifies a structure of the hinge. Because a melting point of the element formed priorly is higher than a melting point of the element formed later, the element formed later does not attach to the priorly-formed element after being cooled down. Therefore, the two elements are relatively rotatable. Additionally, the central element and the surrounding element are respectively formed integratedly so the stability of the hinge is higher compared to a conventional hinge comprising so many components. Finally, because a manufacturing process of the hinge is accomplished after injection molding twice, the process of manufacturing the hinge is more convenient and faster, and the cost is lowered compared to the process of making a conventional hinge that involves much assembling work.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
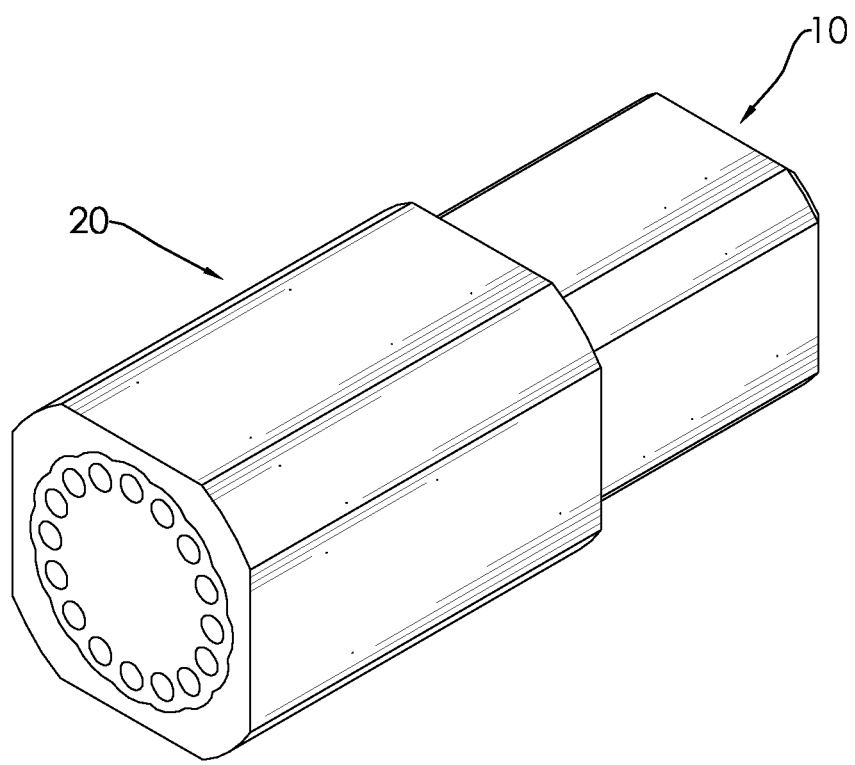
FIG. 1 is a perspective view of a hinge in accordance with the present invention.

With reference to FIG. 1, a hinge in accordance with the present invention comprises a central element 10 and a surrounding element 20.

Figure 2:
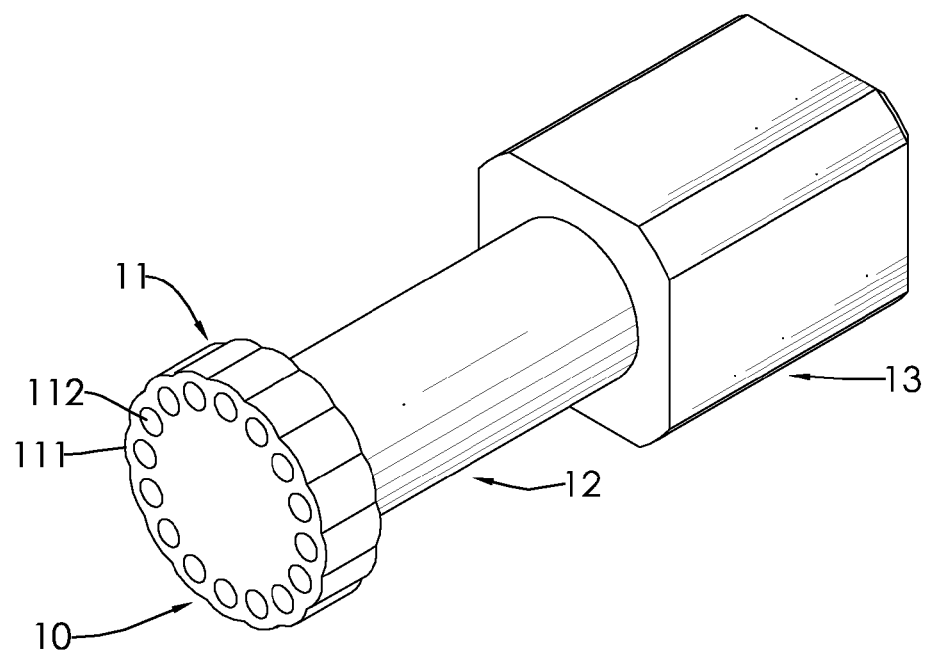
FIG. 2 is a perspective view of a central element of the hinge in FIG. 1.
Figure 3:
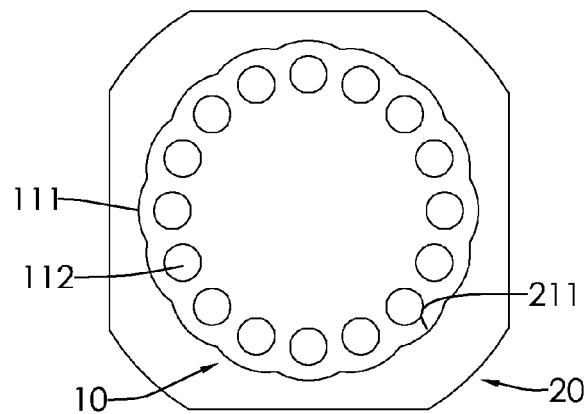
FIG. 3 is a front view of the hinge in FIG. 1.
Figure 4:
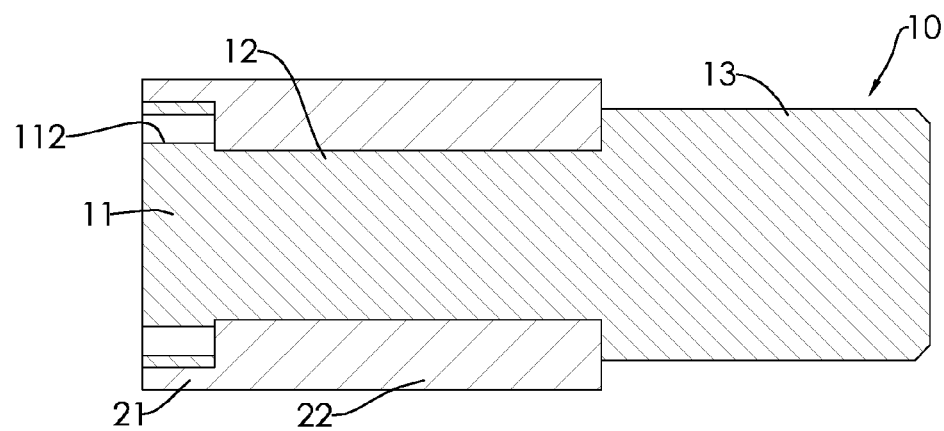
FIG. 4 is a side view in partial section of the hinge in FIG. 1.

With reference to FIGS. 2 to 4, the central element 10 is formed integratedly and has a mounting segment 11, a neck segment 12 and a fastening segment 13 formed axially in sequence. The neck segment 12 is circular in cross section. An outer diameter of the neck segment 12 is smaller than a width of the mounting segment 11 and a width of the fastening segment 13. In a preferred embodiment, the mounting segment 11 is circular in cross section. The mounting segment 11 has multiple positioning protrusions 111. The positioning protrusions 111 are formed on an outside wall of the mounting segment 11 and are arranged annularly. Each positioning protrusion 111 is curved. The mounting segment 11 has multiple compressing holes 112. The compressing holes 112 are formed through an end of the mounting segment 11 and are arranged annularly. A number of the compressing holes 112 is equal to a number of the positioning protrusions 111. Each compressing hole 112 is transversely inward relative to one of the positioning protrusions 111. The fastening segment 13 is substantially rectangular in cross section. The central element 10 is made of plastic material, and preferably the central element 10 is made of Polyphenylene sulfide (PPS).

Figure 5:
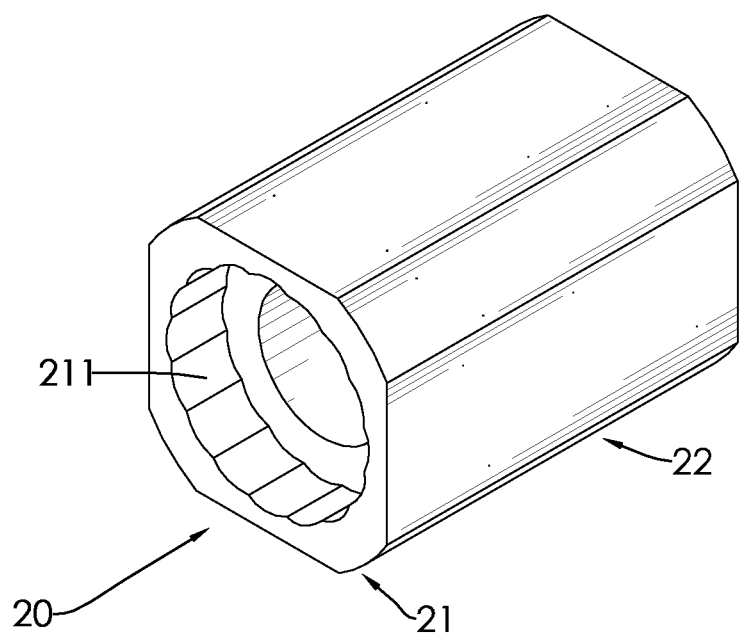
FIG. 5 is a perspective view of a surrounding element of the hinge in FIG. 1.

With reference to FIGS. 3 to 5, the surrounding element 20 is formed integratedly, is mounted rotatably around the central element 10 and has a limit segment 22. The limit segment 22 is mounted around and is flush with the neck segment 12 of the central element 10. Two ends of the limit segment 22 respectively abut the mounting segment 11 and the fastening segment 13 of the central element 10. In a preferred embodiment, the surrounding element 20 further comprises a positioning segment 21. The positioning segment 21 is formed on one of the two ends of the limit segment 22, and is mounted around and is flush with the mounting segment 11. The positioning segment 21 has multiple positioning recesses 211. The positioning recesses 211 are formed in an inside wall of the positioning segment 21, are arranged annularly and selectively engage with the positioning protrusions 111. Each positioning recess 211 is curved. A melting point of the central element 10 is higher than a melting point of the surrounding element 20. The material of the surrounding element 20 is plastic and is different from the material of the central element 10, and preferably the surrounding element 20 is made of Polyoxymethylene (POM).

In another preferred embodiment, the surrounding element 20 is made of Polyphthalamide (PPA) and glass fiber, wherein a weight ratio of Polyphthalamide to glass fiber is 2 to 1. This material is a plastic material from EMS GRIVORY®, and the model number of the material is GV-5H.

Figure 6:
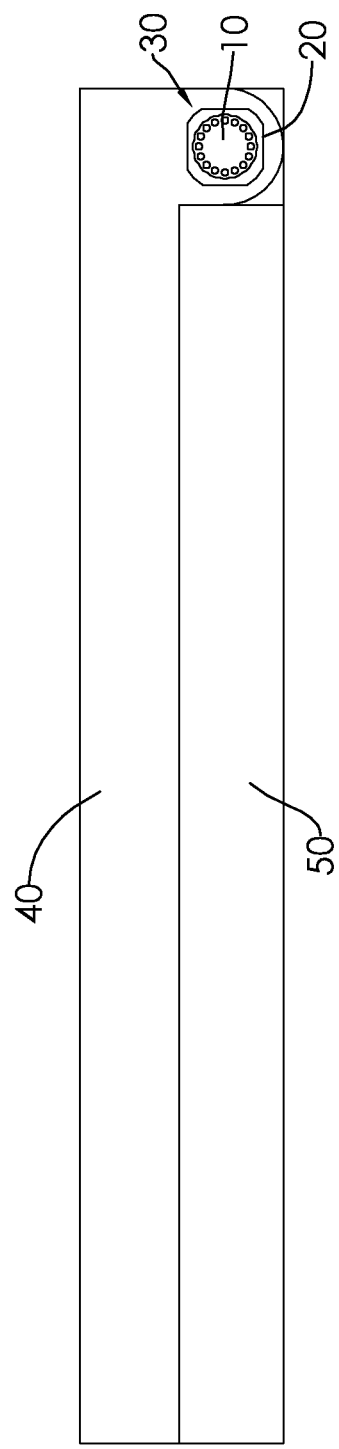
FIG. 6 is a schematic view of a flip device in accordance with the present invention with the hinge in FIG. 1.

With reference to FIG. 6, a flip device in accordance with the present invention comprises a hinge 30 as described, a cover 40 and a base 50. The surrounding element 20 of the hinge 30 is securely mounted to the cover 40. The central element 10 of the hinge 30 is securely mounted on the base 50. In a preferred embodiment, the flip device has two hinges 30. The hinges 30 are respectively mounted on two sides on the back of the flip device. The central element 10 is mounted on the base 50 by the fastening segment.

The flip device may be portable electronic devices or other devices, such as notebook computers or cosmetics boxes.

With reference to FIGS. 3, 4 and 6, when the flip device as described is used, the cover 40 is opened and pivoted relative to the base 50, and the surrounding element 20 is rotated relative to the central element 10 as well. In the rotation, the positioning recesses 211 of the surrounding element 20 press toward the positioning protrusions 111 of the central element 10, and the positioning protrusions 111 deform via the compressing hole 112 such that the positioning protrusions 111 can smoothly pass through the positioning recesses 211, which engage the positioning protrusions 111. When the external force on the cover 40 is removed, if tops of the positioning protrusions 111 do not abut against bottoms of the positioning recesses 211 precisely, which means the compressing holes 112 are still deformed, the compressing holes 112 press outward on the positioning protrusions 111 to be recovered. Therefore the positioning protrusions 111 are slightly rotated along a curved surface of the positioning recesses 211, until the tops of the positioning protrusions 111 abut against the bottoms of the positioning recesses 211 precisely. As a result, the cover 40 can be held at some specific angles relative to the base 50, and the cover 40 will not lean or lie flat by the weight of the cover 40. Besides, the more positioning protrusions 111 and positioning recesses 211, the more specific angles the hinge 30 is able to maintain.

When the hinge 30 as described is in manufacturing process, one of the central element 10 and the surrounding element 20 is formed by injection molding, and then is cooled down. Afterwards, the other element is formed on the priorly-formed element by injection molding. In a preferred embodiment, the element formed priorly is the central element 10, and the element formed later is the surrounding element 20. Because the melting point of the central element 10 is higher than the melting point of the surrounding element 20, the central element 10 is not melted when the surrounding element 20 wraps the central element 10 and is being formed by injection molding such that the surrounding element 20 is not attached to the central element 10 after being cooled down. Additionally, the mounting segment 11 and the neck segment 12 are circular in cross section, and an inside surface of the surrounding element 20 is mounted around and is flush with the mounting segment 11 and the neck segment 12. As a result, the inside surface of the surrounding element 20 is circular as well. Then the surrounding element 20 is rotatable relative to the central element 10. Besides, when the surrounding element 20 wraps the central element 10 and is being formed by injection molding, the material of the surrounding element 20 flows into and is mounted around the neck segment 12 of the central element 10 such that after the surrounding element 20 is cooled down and solidified, the limit segment 22, which wraps the neck segment 12, abuts axially the mounting segment 11 and the fastening segment 13, which are respectively on the two sides of the neck segment 12. As a result, the central element 10 is unable to move axially relative to the surrounding element 20. To sum up, after being formed by injection molding twice, the hinge 30 reaches the essential requirement of being rotatable relatively but being unable to move relatively.

Moreover, the central element 10 forms the positioning protrusions 111 and compressing holes 112 after being formed by injection molding, and the surrounding element 20 forms the positioning recesses 211 after being formed by injection molding such that the hinge 30 further reaches the requirement of being held at multiple angles.

The manufacturing process of the hinge 30 is accomplished after injection molding twice, and the hinge 30 meets the requirements mentioned above at the same time. As a result, the hinge is convenient in manufacturing and beneficial for mass production. The cost is lowered therefore.

Furthermore, the hinge 30 is made of plastic, which further lowers the cost. Finally, the hinge 30 is formed by injection molding, so the central element 10 and the surrounding element 20 are respectively formed integratedly to enhance the stability when in use.

In another preferred embodiment, the melting point of the surrounding element is higher than the melting point of the central element. When the hinge is in manufacturing process, the surrounding element is formed by injection molding. After the surrounding element is cooled down, the central element is formed on the surrounding element by injection molding. The hinge also has the advantages mentioned above.

In another preferred embodiment, the flip device has only one hinge, and the hinge is mounted in the middle on the back of the flip device. The flip device also has the advantages mentioned above.

In another preferred embodiment, in the flip device, the central element is securely mounted to the cover, and the surrounding element is securely mounted on the base. The flip device also has the advantages mentioned above.

Figure 7:
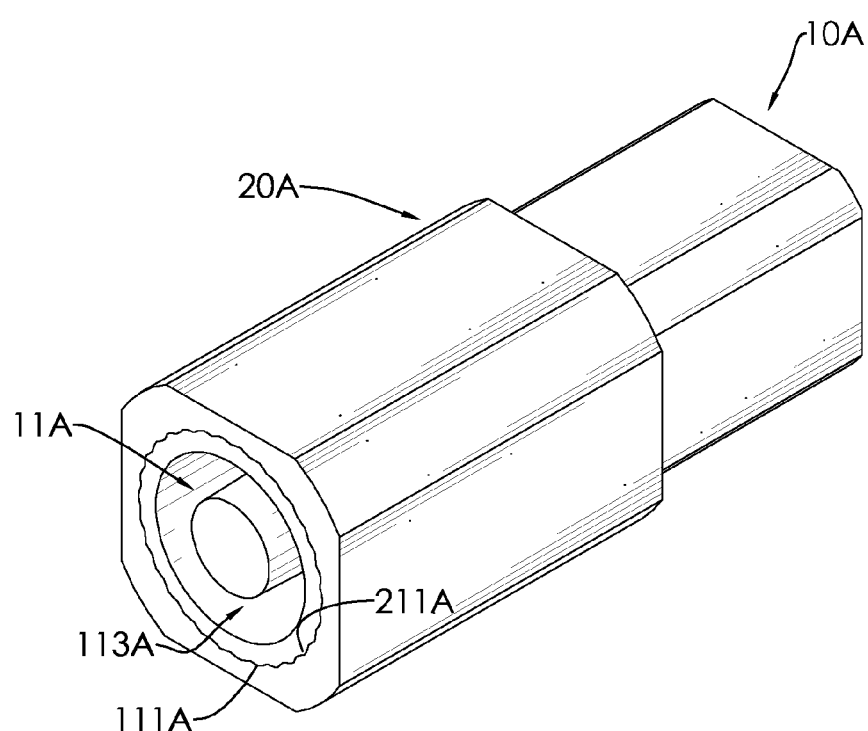
FIG. 7 is a perspective view of another embodiment of a hinge in accordance with the present invention.
Figure 8:
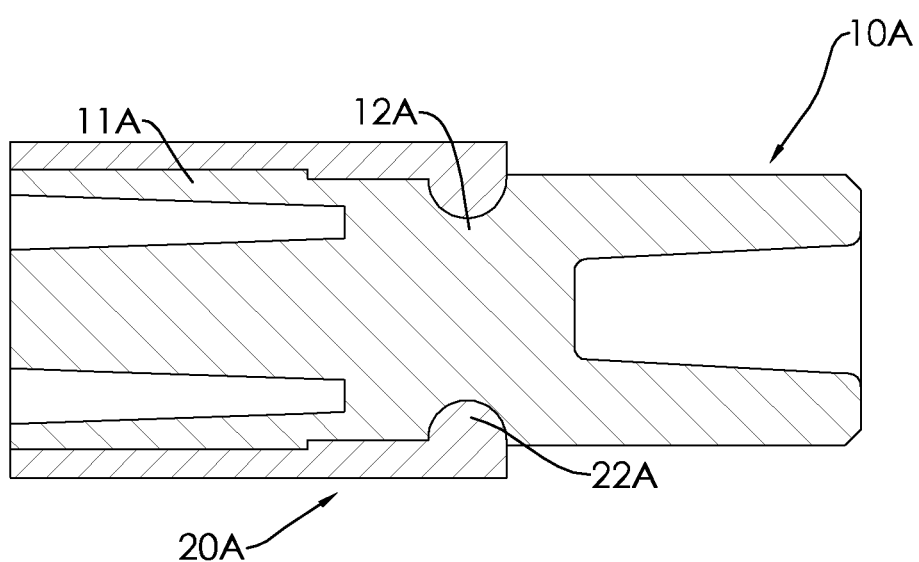
FIG. 8 is a side view in partial section of the hinge in FIG. 7.

With reference to FIGS. 7 and 8, in the hinge, the mounting segment 11A of the central element 10A has a compressing annular recess 113A formed in the end of the mounting segment 11A. The compressing annular recess 113A also provides a deforming space to the positioning protrusions 111A, so the positioning protrusions 111A can pass through the positioning recesses 211A more smoothly. Besides, a length of the neck segment 12A is shortened. With the limit segment 22A mounted around and flush with the neck segment 12A, the neck segment 12A can still keep the surrounding element 20A from departing axially from the central element 10A.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
   a central element formed integratedly, and having a mounting segment, a neck segment and a fastening segment formed axially in sequence, wherein the neck segment and the mounting segment are both circular in cross section, and an outer diameter of the neck segment is smaller than a width of the mounting segment and a width of the fastening segment; and
   a surrounding element mounted rotatably around the central element, formed integratedly, and having
   a limit segment mounted around and flush with the neck segment of the central element, wherein two ends of the limit segment respectively abut the mounting segment and the fastening segment of the central element; and
   a positioning segment formed on one of the two ends of the limit segment, and mounted around and flush with the mounting segment;
   wherein the mounting segment has multiple positioning protrusions formed on an outside wall of the mounting segment, and arranged annularly; and
   the positioning segment has multiple positioning recesses formed in an inside wall of the positioning segment, arranged annularly, and selectively engaging with the positioning protrusions.

2. The hinge as claimed in claim 1, wherein each positioning protrusion is curved; and each positioning recess is curved.

3. The hinge as claimed in claim 2, wherein the mounting segment of the central element has multiple compressing holes formed through an end of the mounting segment, and arranged annularly.

4. The hinge as claimed in claim 3, wherein a number of the compressing holes is equal to a number of the positioning protrusions of the central element, and each compressing hole is transversely inward relative to one of the positioning protrusions.

5. The hinge as claimed in claim 4, wherein a melting point of the central element is higher than a melting point of the surrounding element.

6. The hinge as claimed in claim 5, wherein
   the central element is made of plastic material; and
   the surrounding element is made of plastic material, and the material of the surrounding element is different from the material of the central element.

7. The hinge as claimed in claim 6, wherein
   the central element is made of Polyphenylene sulfide (PPS); and
   the surrounding element is made of Polyoxymethylene (POM).

8. The hinge as claimed in claim 6, wherein
   the central element is made of Polyphenylene sulfide (PPS); and
   the surrounding element is made of Polyphthalamide (PPA) and glass fiber, wherein a weight ratio of Polyphthalamide to glass fiber is 2 to 1.

9. The hinge as claimed in claim 2, wherein the mounting segment of the central element has a compressing annular recess formed in an end of the mounting segment.

10. The hinge as claimed in claim 1, wherein the mounting segment of the central element has multiple compressing holes formed through an end of the mounting segment, and arranged annularly.

11. The hinge as claimed in claim 10, wherein a number of the compressing holes is equal to a number of the positioning protrusions of the central element, and each compressing hole is transversely inward relative to one of the positioning protrusions.

12. The hinge as claimed in claim 1, wherein the mounting segment of the central element has a compressing annular recess formed in an end of the mounting segment.

13. The hinge as claimed in claim 1, wherein a melting point of the central element is higher than a melting point of the surrounding element.

14. The hinge as claimed in claim 1, wherein
   the central element is made of plastic material; and
   the surrounding element is made of plastic material, and the material of the surrounding element is different from the material of the central element.

15. The hinge as claimed in claim 14, wherein
   the central element is made of Polyphenylene sulfide (PPS); and
   the surrounding element is made of Polyoxymethylene (POM).

16. The hinge as claimed in claim 14, wherein
   the central element is made of Polyphenylene sulfide (PPS); and
   the surrounding element is made of Polyphthalamide (PPA) and glass fiber, wherein a weight ratio of Polyphthalamide to glass fiber is 2 to 1.

17. A flip device with at least one hinge as claimed in claim 1 comprising:
   a cover to which the surrounding element of the hinge is securely mounted; and
   a base on which the central element of the hinge is securely mounted.

18. A flip device with at least one hinge as claimed in claim 1 comprising:
   a cover to which the central element of the hinge is securely mounted; and
   a base on which the surrounding element of the hinge is securely mounted.

* * * * *